US011335194B1

(12) United States Patent
Yasuda et al.

(10) Patent No.: US 11,335,194 B1
(45) Date of Patent: May 17, 2022

(54) INVERSE PARKING DISTANCE CONTROL SYSTEM

(71) Applicant: Toyota Research Institute, Inc., Los Altos, CA (US)

(72) Inventors: Hiroshi Yasuda, San Francisco, CA (US); Manuel Ludwig Kuehner, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 17/214,326

(22) Filed: Mar. 26, 2021

(51) Int. Cl.
*G08G 1/0962* (2006.01)

(52) U.S. Cl.
CPC ................. *G08G 1/0962* (2013.01)

(58) Field of Classification Search
CPC ............................ G08G 1/0962; G08G 1/146
See application file for complete search history.

(56) References Cited

U.S. PATENT DOCUMENTS

| | | | |
|---|---|---|---|
| 9,437,111 B2 | 9/2016 | Ignaczak et al. | |
| 9,552,730 B2 | 1/2017 | Augst | |
| 10,008,116 B1* | 6/2018 | Sandbrook | G08G 1/146 |
| 10,346,694 B2* | 7/2019 | Irie | H04N 5/232941 |
| 2009/0259365 A1* | 10/2009 | Rohlfs | B62D 15/028 |
| | | | 701/41 |
| 2012/0197492 A1* | 8/2012 | Schneider | B62D 15/028 |
| | | | 701/41 |
| 2015/0127222 A1* | 5/2015 | Cunningham, III | B62D 15/027 |
| | | | 701/41 |
| 2016/0117927 A1 | 4/2016 | Stefan et al. | |
| 2016/0288712 A1* | 10/2016 | Noh | B60W 50/14 |
| 2017/0183001 A1* | 6/2017 | Yamamoto | B60W 10/10 |
| 2018/0029641 A1* | 2/2018 | Solar | G06T 7/90 |
| 2018/0056858 A1 | 3/2018 | Cunningham, III et al. | |
| 2018/0165962 A1* | 6/2018 | Neystadt | G08G 1/165 |
| 2018/0304885 A1* | 10/2018 | Kang | B62D 15/0285 |
| 2018/0334163 A1* | 11/2018 | Beauvais | B60W 30/06 |
| 2019/0009713 A1 | 1/2019 | Pal et al. | |
| 2019/0064809 A1* | 2/2019 | Salter | G05D 1/028 |
| 2019/0101925 A1* | 4/2019 | Simmons | G05D 1/0231 |
| 2019/0193725 A1* | 6/2019 | Suzuki | G05D 1/0011 |
| 2019/0329760 A1* | 10/2019 | Harase | B60R 21/00 |
| 2019/0375410 A1* | 12/2019 | Zinner | B60W 50/0097 |
| 2020/0216063 A1* | 7/2020 | Lim | G08G 1/167 |
| 2020/0250977 A1* | 8/2020 | Kim | G06K 9/00812 |

(Continued)

FOREIGN PATENT DOCUMENTS

| | | |
|---|---|---|
| DE | 102007021405 A1 | 1/2008 |
| DE | 102010001264 A1 | 7/2011 |

*Primary Examiner* — Hoi C Lau
(74) *Attorney, Agent, or Firm* — Christopher G. Darrow; Darrow Mustafa PC

(57) ABSTRACT

System, methods, and other embodiments described herein relate to providing inverse parking distance control (PDC). In one embodiment, a method for providing inverse PDC includes obtaining sensor data indicating an entity approaching the vehicle, determining whether the entity is a parking vehicle based on one or more characteristics of the entity derived based on the sensor data, determining whether the entity is utilizing a PDC system, and triggering a proximity alert when the entity approaches within a threshold distance of the vehicle and is determined to be a parking vehicle that is not utilizing a PDC system.

20 Claims, 9 Drawing Sheets

(56) References Cited

U.S. PATENT DOCUMENTS

| | | | | |
|---|---|---|---|---|
| 2020/0377077 A1* | 12/2020 | Nessler | ................. | B60Q 5/005 |
| 2021/0070282 A1* | 3/2021 | Kim | ................. | G06K 9/00812 |
| 2021/0213946 A1* | 7/2021 | Adwan | ................. | G01S 13/426 |

* cited by examiner

INVERSE PARKING DISTANCE CONTROL SYSTEM

TECHNICAL FIELD

The subject matter described herein relates, in general, to systems and methods for improving parking distance control (PDC) of a vehicle, and more particularly, to an inverse PDC system that can issue a proximity warning(s) to an approaching vehicle that is not utilizing a PDC system.

BACKGROUND

Available parking areas, particularly in urban settings, are becoming more cramped and growing in demand as the number of vehicles steadily rises. Increases in traffic volume and difficulty in locating a suitable parking space can put additional stress on the driver of a vehicle. When parking, the driver of a vehicle, who may be stressed and hurried, must struggle to remain particularly focused despite the driver's mental state and many distractions that can snare a driver's attention, such as text messages, phone calls, pedestrian traffic, etc. Some vehicles include a parking distance control (PDC) that automatically alerts a potentially distracted driver of a vehicle when the vehicle approaches within a close proximity of another vehicle while parking, thereby reducing the likelihood of a parking related accident. Despite the effectiveness of a PDC system, many vehicles do not include a PDC system for various reasons, for example, to maintain a lower price.

SUMMARY

The disclosed systems and methods provide inverse parking distance control to enable a parked vehicle to assist a parking vehicle that does not have a parking distance control (PDC) system (or that has a PDC system that is not active) by providing timely audio/visual proximity alerts from the parked vehicle when the parking vehicle approaches the parked vehicle while attempting to park.

In one embodiment, an inverse parking distance control (PDC) system includes a sensor to generate sensor data indicating an entity approaching the vehicle. The inverse PDC system further includes a processor and a memory, communicably connected to the one or more processors, storing: a vehicle detection module including instructions that, when executed by the processor, cause the processor to determine whether the entity is a parking vehicle based on one or more characteristics of the entity derived based on the sensor data, a PDC detection module including instructions that, when executed by the processor, cause the processor to determine whether the entity is utilizing a PDC system, and an alert module including instructions that, when executed by the processor, cause the processor to trigger a proximity alert when the entity approaches within a threshold distance of the vehicle and is determined to be a parking vehicle that is not utilizing a PDC system.

In another embodiment, a method for providing inverse parking distance control includes obtaining sensor data indicating an entity approaching the vehicle, determining whether the entity is a parking vehicle based on one or more characteristics of the entity derived based on the sensor data, determining whether the entity is utilizing a PDC system, and triggering a proximity alert when the entity approaches within a threshold distance of the vehicle and is determined to be a parking vehicle that is not utilizing a PDC system.

In another embodiment, a non-transitory computer-readable medium providing inverse parking control includes instructions that, when executed by one or more processors, cause the one or more processors to obtain sensor data indicating an entity approaching the vehicle, determine whether the entity is a parking vehicle based on one or more characteristics of the entity derived based on the sensor data, determine whether the entity is utilizing a PDC system, and trigger a proximity alert when the entity approaches within a threshold distance of the vehicle and is determined to be a parking vehicle that is not utilizing a PDC system.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
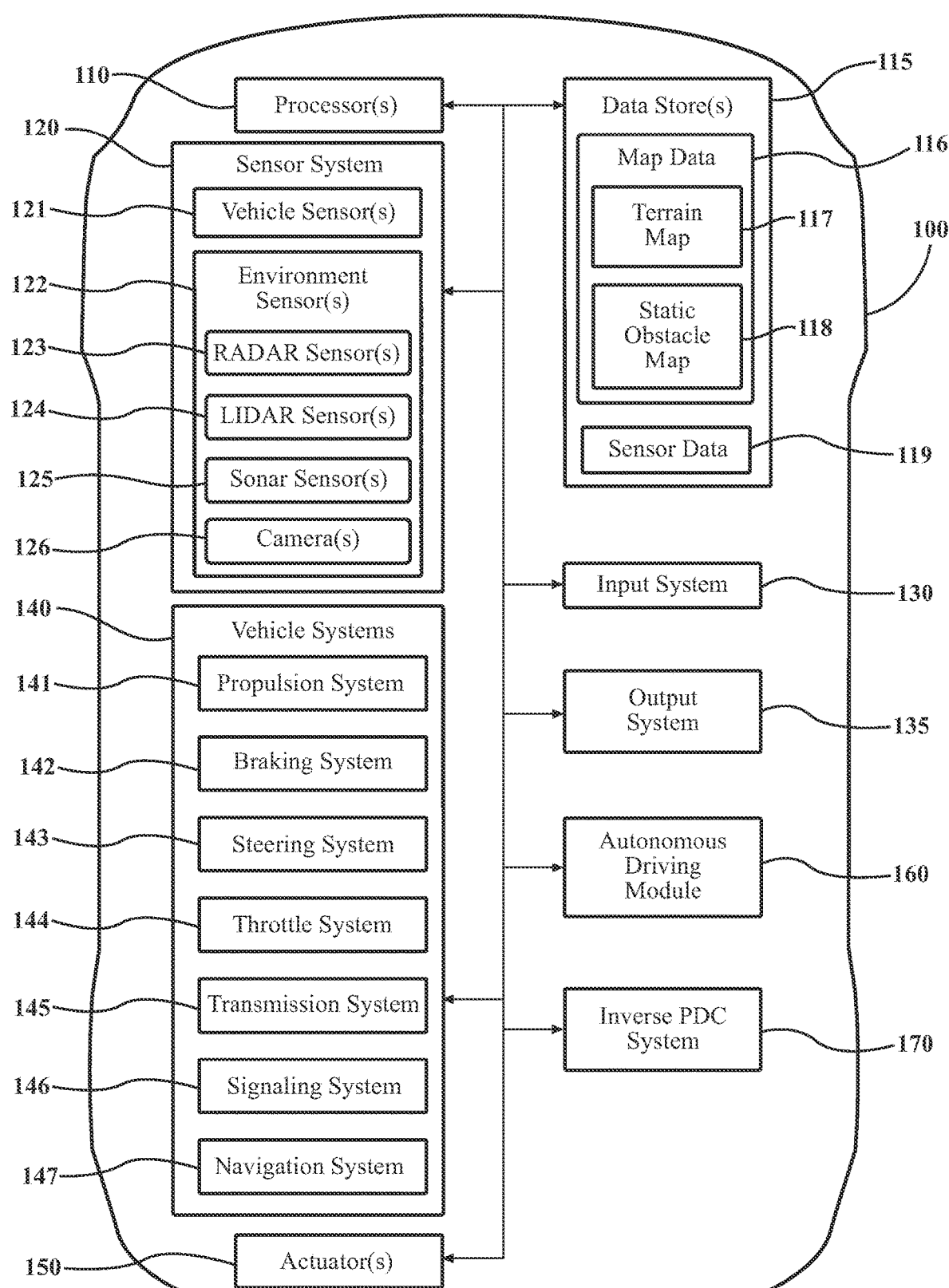
FIG. 1 illustrates one embodiment of a vehicle within which systems and methods disclosed herein may be implemented.

Systems, methods, and embodiments associated with providing inverse parking distance control (PDC) are disclosed. In one or more embodiments, a subject vehicle includes an inverse PDC system that can activate when the subject vehicle is parked and can remain activated for the duration of time that the vehicle is parked, e.g., in a low-power detection state. The inverse PDC system can include one or more proximity sensors that can operate in the low-power state to detect when an object approaches the subject vehicle. When the detected object is within a predetermined distance from the subject vehicle, the inverse PDC system can cause the subject vehicle to emit an audio and/or visual alert.

Prior to emitting an alert, the inverse PDC system can take steps to determine whether the detected object is another vehicle actively attempting to park near or adjacent to the subject vehicle, or is some other type of entity, such as a bicycle, pedestrian, or vehicle that is merely passing by and not attempting to park near the subject vehicle. In one or more embodiments, the inverse PDC system can determine one or more of a size estimate for the detected object, a trajectory estimate for the detected object, and a speed estimate for the detected object. In one or more embodiments, the inverse PDC system can obtain a data set of sensor data obtained over a period of time (e.g., five seconds, ten seconds, etc.) to determine if the data set indicates a trend or pattern consistent with one or more stored profiles of parking vehicles.

Furthermore, in one or more embodiments the inverse PDC system can determine that the detected object is not a parking vehicle based on the size estimate, for example, when the size estimate indicates the detected object is not large enough to be a parking vehicle (e.g., a bicycle, pedestrian, etc.). The inverse PDC system can also determine that the detected object is not a parking vehicle based on the trajectory estimate, for example, when the trajectory estimate indicates the detected object is not approaching the subject vehicle but instead passing by. The inverse PDC system can further determine that the detected object is not a parking vehicle based on the speed estimate, e.g., when the speed estimate indicates the detected object is not slowing down as it approaches the subject vehicle as would be characteristic of a parking vehicle.

In any case, when the disclosed inverse PDC system determines that the detected object is not a parking vehicle, the system will forgo activating any alert in response to the detected object. In this manner the discloses system will not cause unnecessary disruption or false alarms that may annoy individuals in the vicinity.

As another precaution, even when the inverse PDC system determines that the detected object is a parking vehicle, the system can detect whether the detected parking vehicle is equipped with and utilizing its own PDC system. In this case, assistance from the disclosed inverse PDC system would be duplicative, unnecessary and potentially disruptive.

To avoid a duplicative and possibly negative effect, the disclosed system can attempt to detect and measure whether the detected parking vehicle is emitting signals consistent with use of a PDC system, such as ultrasonic or electromagnetic signals or pulses. For example, if the disclosed system detects a series of ultrasonic pulses emitted from the direction of the detected parking vehicle, the disclosed system can determine that the detected parking vehicle is equipped with and currently utilizing its own PDC system and therefor forgo providing any additional assistance to the driver of the detected parking vehicle.

However, when the disclosed inverse PDC system does not detect evidence of a detected parking vehicle utilizing its own PDC system, the disclosed system can provide parking assistance by providing one or more proximity alerts as the detected parking vehicle approaches. In one or more embodiments, the disclosed system can escalate an intensity of the proximity alerts as the distance between subject vehicle and the detected parking vehicle decreases. For example, at a first distant range the disclosed system can utilize a visual proximity alert, e.g., flash hazard lights as a warning. At a second distance range, shorter than the first distant range, the disclosed system can intensify the visual proximity alert, e.g., flash headlights/high beams along with the flashing hazard lights. At a third distant range, shorter than the second distant range, the disclosed system can intensify further by adding an audible proximity alert, e.g., honk the horn. That is, in one or more embodiments the disclosed system can attempt to resort to audio alerts, which can be most attention getting and most disruptive, as a last resort. Moreover, in one or more embodiments the disclosed system can escalate intensity by controlling a frequency of flashing lights as a function of distance, e.g., increase the frequency as the distance decreases.

In one or more embodiments, the disclosed inverse PDC system can make use of existing components of the subject vehicle to generate visual/audio proximity alerts. In one or more embodiments, the disclosed system can include additional notification components, such as a windshield display, one or more specialized external indicator components such as special lights or displays, etc.

Referring to FIG. 1, an example of a vehicle 100 is illustrated. As used herein, a "vehicle" is any form of powered transport. In one or more implementations, the vehicle 100 is a front-wheel drive automobile. While arrangements will be described herein with respect to automobiles, it will be understood that embodiments are not limited to automobiles. In some implementations, the vehicle 100 may be any form of powered, multi-wheeled transport or vehicle that can be parked near other vehicles and therefore may benefit from the functionality discussed herein.

As shown in FIG. 1, the vehicle 100 includes multiple elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2-5 for purposes of brevity in this description. It will be appreciated that for simplicity and clarity of illustration, where appropriate, reference numerals have been repeated among the different figures to indicate corresponding or analogous elements. In addition, while the discussion outlines numerous specific details to provide a thorough understanding of the embodiments described herein, those of skill in the art, will understand that the embodiments described herein may be practiced using various combinations of these elements.

In any case, the vehicle 100 includes one or more environment sensor(s) 122 that can generate sensor data indicating aspects of an environment around the vehicle 100 and an inverse PDC system 170 that functions to automatically detect an approaching, parking vehicle based on the sensor data. The inverse PDC system 170 can provide parking assistance to a driver of the parking vehicle by using audio/visual proximity alerts, e.g., implemented by existing components of the vehicle 100.

While the inverse PDC system 170 is depicted as a standalone component, in one or more embodiments, the inverse PDC system 170 can be integrated with another component of the vehicle 100, such as the autonomous driving module 160 or other drive control system of the vehicle 100. For example, in one or more embodiments an autonomous driving module 160 can automatically activate the inverse PDC system 170 upon parking the vehicle. The noted functions and methods will become more apparent in the following discussion of the figures.

Figure 2:
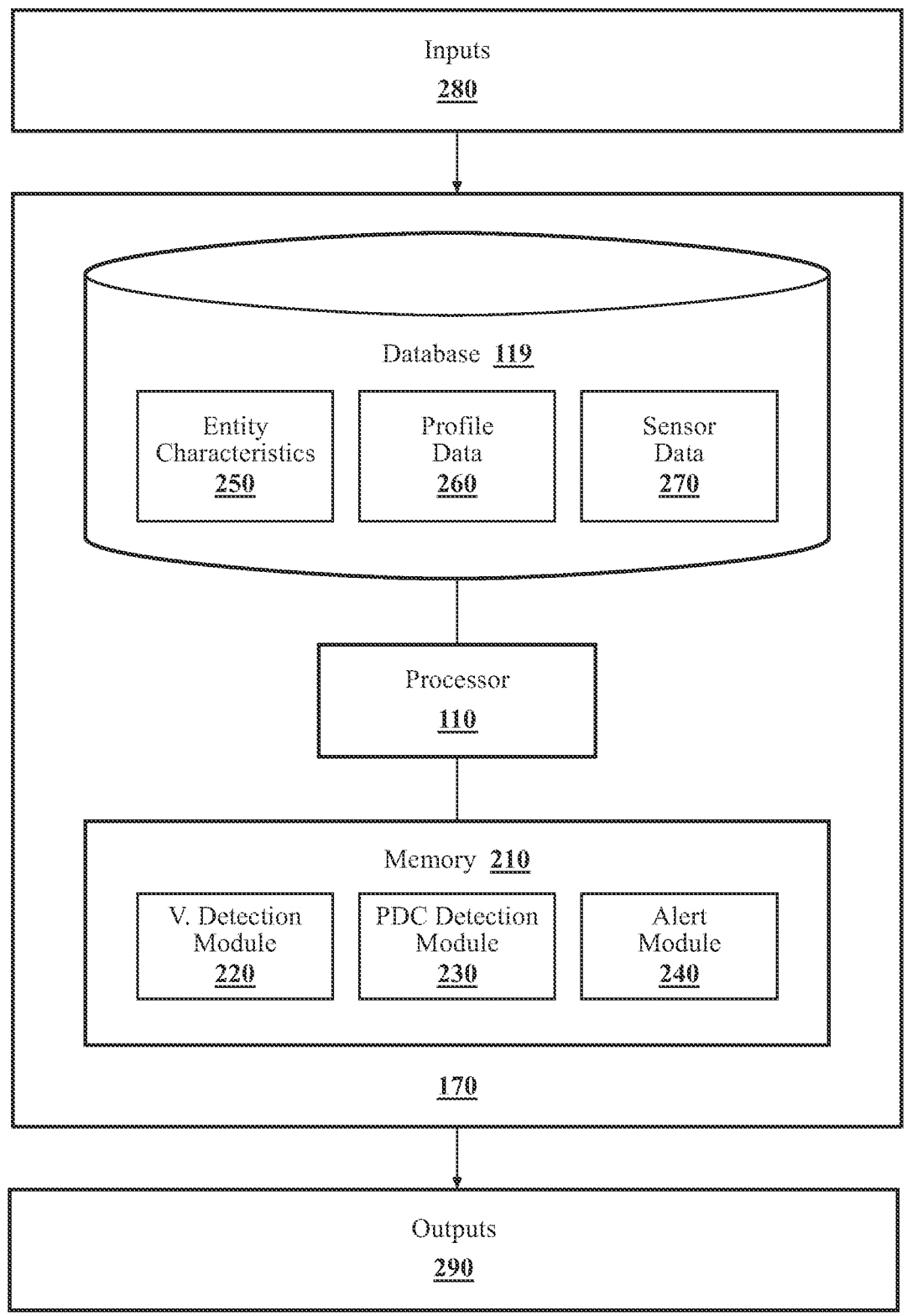
FIG. 2 illustrates one embodiment of an inverse PDC system according to the disclosed embodiments.

With reference to FIG. 2, one embodiment of the inverse PDC system 170 of FIG. 1 is illustrated. The inverse PDC system 170 is shown as including a processor 110 and database 119 from the vehicle 100 of FIG. 1. Accordingly, the processor 110 may be a part of the inverse PDC system 170, the inverse PDC system 170 may include a processor separate from the processor 110 of the vehicle 100 or the inverse PDC system 170 may access the processor 110 through a data bus or another communication path.

The inverse PDC system 170 includes a database 119 that stores, among other things, sensor data 270 (e.g., data received from the environment sensors 122), entity characteristic data 250 (e.g., data derived from sensor data indicating characteristics of a detected entity such as dimensions, speed, etc.) and parking vehicle profile data 260 (e.g., data that indicate size, speed, trajectory profile data of parking vehicles), as will be discussed further below. The database 119, in one embodiment, is constructed as an electronic data structure stored in the memory 210 or another data store, such as the vehicle 100 data store 115, a cloud-based storage, a removable memory device, or another suitable location that is accessible to the modules 220, 230 and 240. The database 119 is configured with routines that can be executed by the processor 110 for analyzing stored data, providing stored data, organizing stored data, and so on. Thus, in one embodiment, the database 119 stores data described above (as well as other data) used by the modules 220, 230 and 240 in executing various functions.

Additionally, the inverse PDC system 170, in one or more embodiments, includes a memory 210 that stores a vehicle detection module 220, a PDC detection module 230 and an alert module 240. The memory 210 can be constructed as a random-access memory (RAM), read-only memory (ROM), a hard-disk drive, a flash memory, or other suitable memory for storing the modules 220, 230 and 240. The modules 220, 230 and 240 are, for example, constructed as computer-readable instructions that when executed by the processor 110 cause the processor 110 to perform the various functions disclosed herein.

The inverse PDC system 170 can receive various inputs 280 and store and/or process the inputs 280, e.g., as sensor data 270 generated by and received from environment sensors 122. The inverse PDC system 170 can generate outputs 290, for example, actuation commands to activate one or more audio and/or visual alert components of the vehicle 100, such as headlights (not shown), hazard lights (not shown), high-beam lights (not shown), turn signal lights (not shown), a horn (not shown), security system siren (not shown), etc.

In operation, the inverse PDC system 170 can receive and analyze inputs 280, such as sensor data 270, to identify an entity in a vicinity of the vehicle 100. The vehicle detection module 220 is generally constructed including instructions that function to control the processor 110 to determine whether the entity is actually a parking vehicle based on one or more entity characteristics 250 derived from analysis of the sensor data 270. In one or more embodiments, the entity characteristics 250 can include one or more of dimensions of the entity, speed of the entity, and a trajectory/projected trajectory of the entity, as will be discussed further below.

The PDC detection module 230 is generally constructed including instructions that function to control the processor 110 to determine whether the entity is utilizing a PDC system. In one or more embodiments, the PDC detection module 230 can determine whether the entity is utilizing a PDC system based on detecting, e.g., with a sensor of the environment sensors 122, whether the entity is emitting signals consistent with use of a PDC system, such as ultrasonic or electromagnetic pulses or signals.

The alert module 240 is generally constructed including instructions that function to control the processor 110 to trigger or initiate a proximity alert when the entity: 1) approaches within a threshold distance of the vehicle 100, and 2) is determined to be a parking vehicle that is not utilizing a PDC system. In one or more embodiments, the alert module 240 can trigger the alert when the entity approaches within a threshold distance of the vehicle 100 in combination with moving above a threshold speed. In one or more embodiments, the proximity alert comprises a visual alert triggered when the entity enters a first distance range from the vehicle 100 and an audio alert triggered when the entity enters a second distance range from the vehicle 100 shorter than the first distance range. That is, in one or more embodiments the proximity alert is a continuous alert that the alert module 240 can maintain and modify for the duration of the parking incident and deactivate when the parking incident is complete (i.e., when the entity has parked and is no longer moving). As used herein, the term 'trigger' refers to initiating the proximity alert.

In one or more embodiments, the alert module 240 can trigger the alert with an audible alert (e.g., a horn honk or siren) when the entity approaches within a threshold distance even if the entity has activated a PDC system.

When the entity is not determined to be a parking vehicle (i.e., instead determined to be a pedestrian, a bicycle, a passing vehicle, etc.) alert module 240 forgoes triggering the proximity alert. Furthermore, when the entity is determined to be a parking vehicle but is also determined to be currently utilizing a PDC system, the alert module 240 forgoes triggering the proximity alert.

Figure 3A:
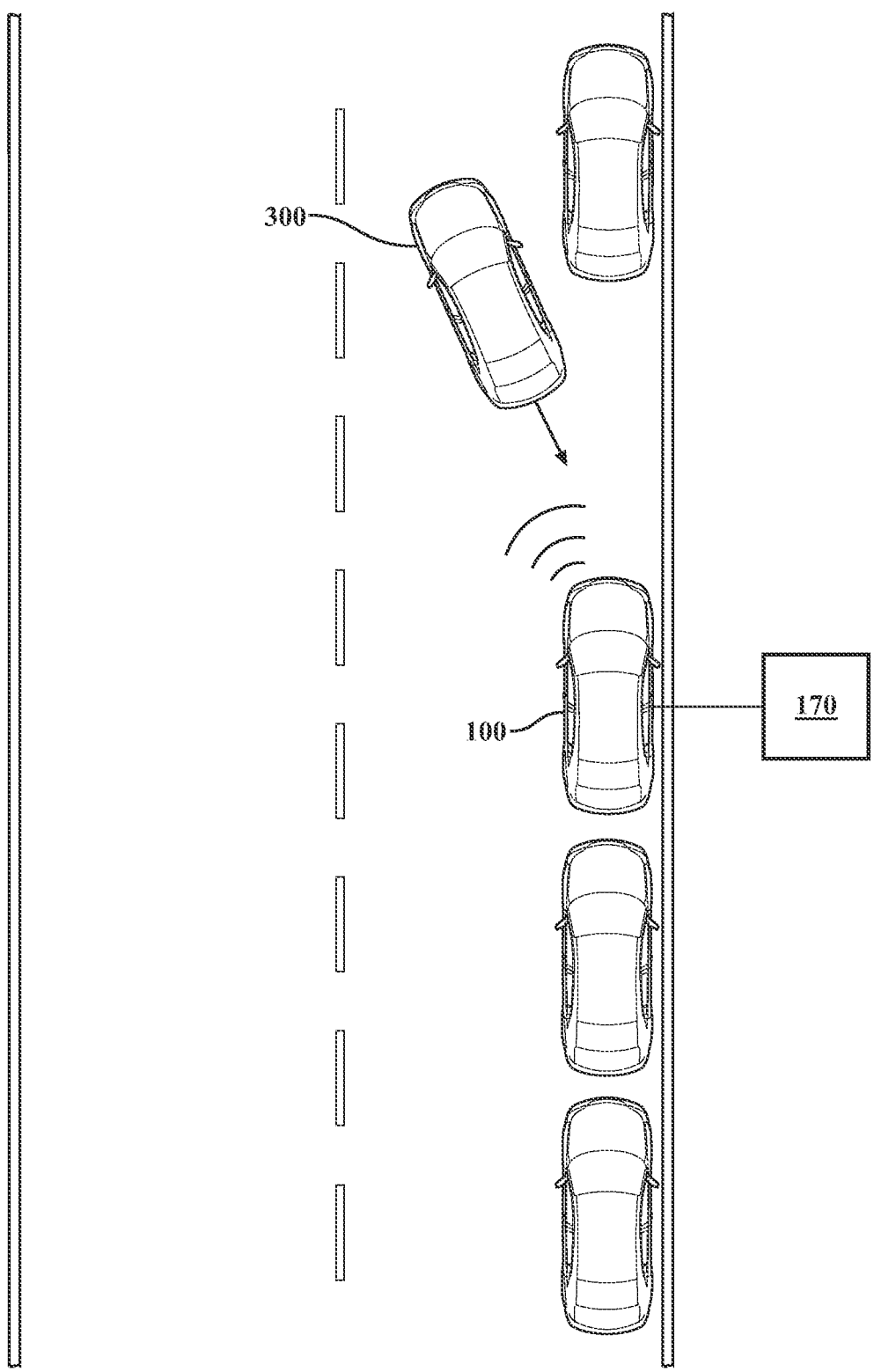
FIG. 3A illustrates an example of an entity approaching a vehicle using an inverse PDC system, according to the disclosed embodiments.
Figure 3B:
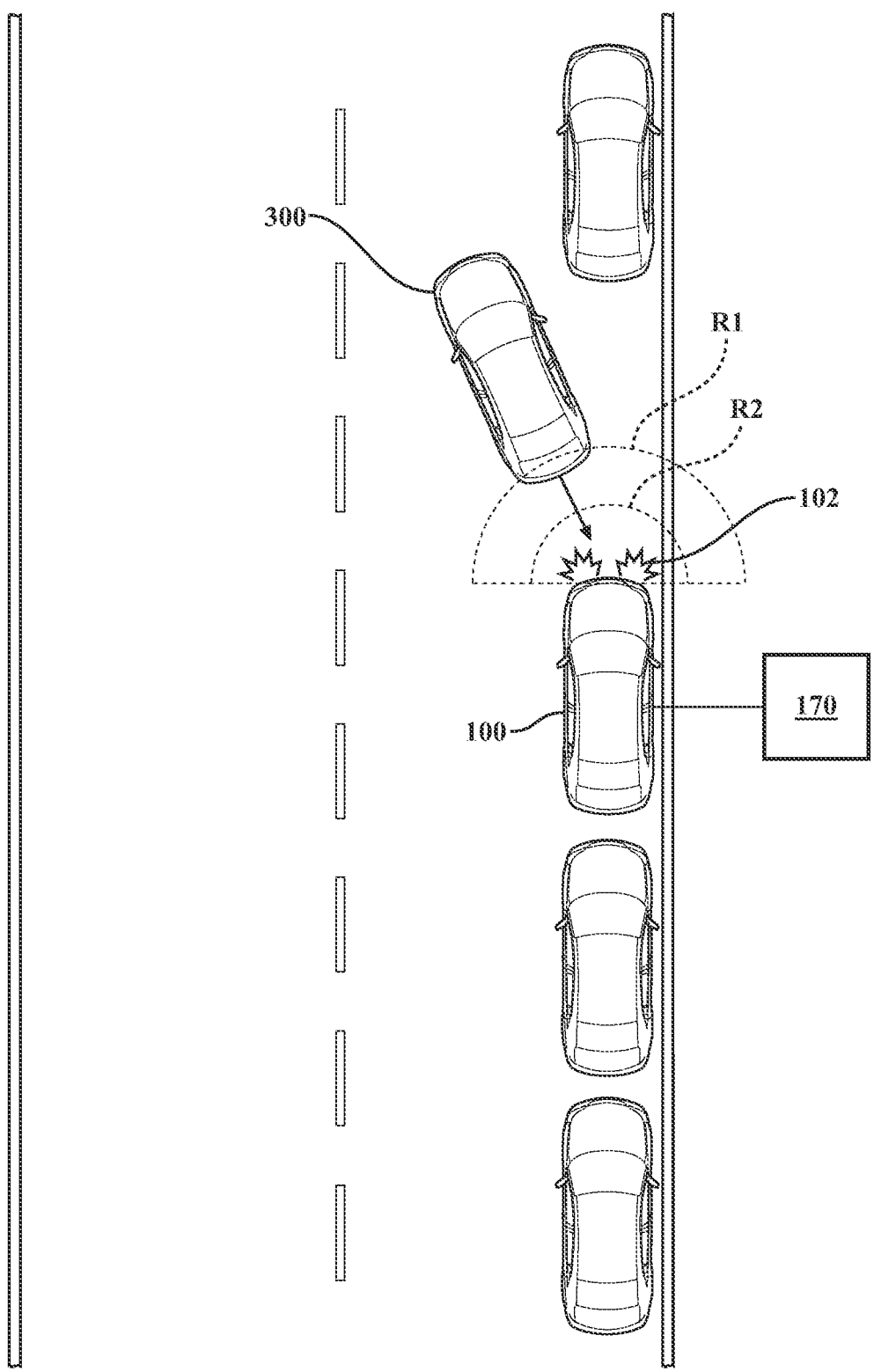
FIG. 3B illustrates an example of an entity entering a first distance range of a vehicle using an inverse PDC system, according to the disclosed embodiments.
Figure 3C:
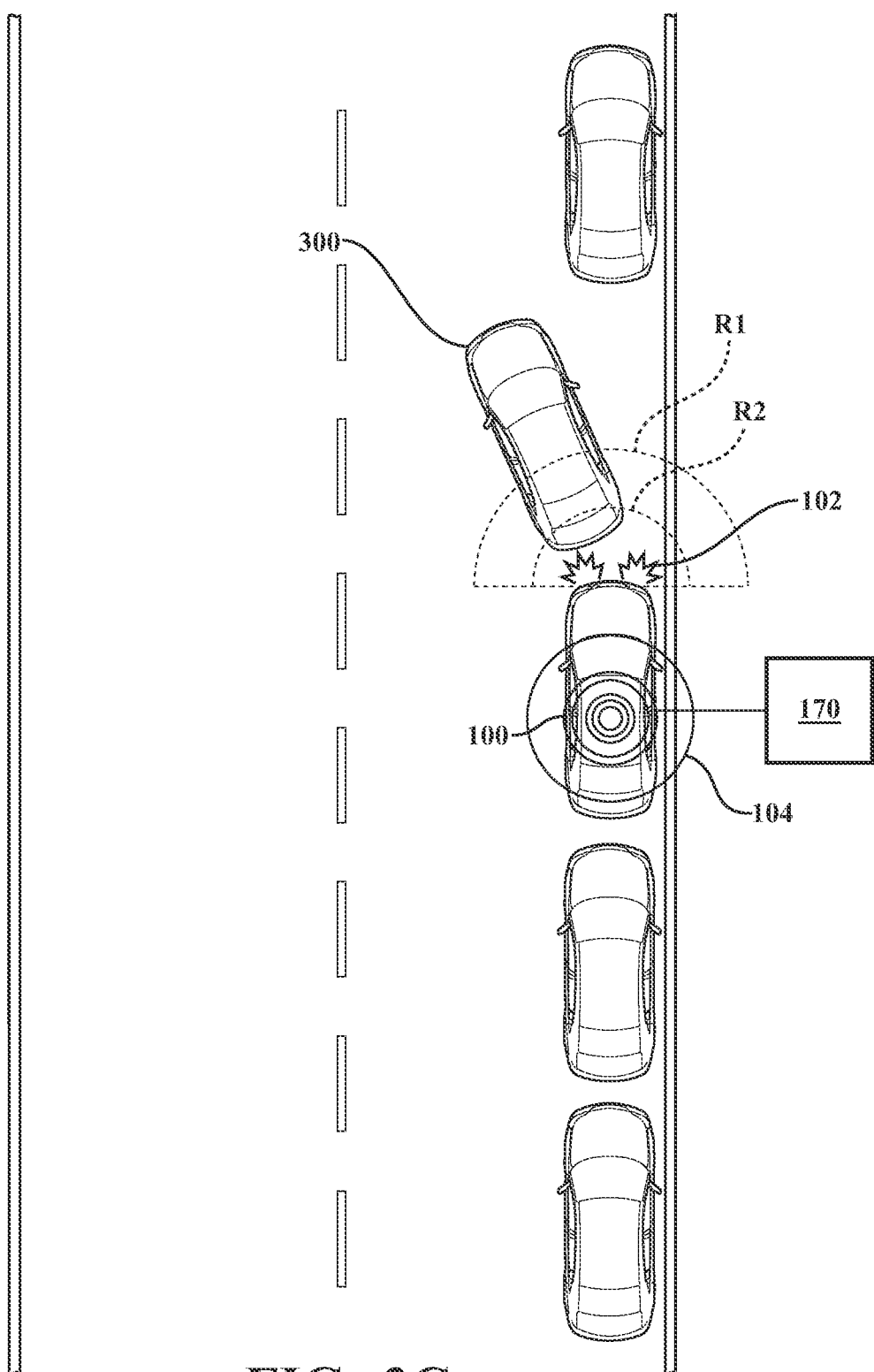
FIG. 3C illustrates an example of an entity entering a second distance range of a vehicle using an inverse PDC system, according to the disclosed embodiments.

FIGS. 3A-3C illustrate an example scenario in which the disclosed inverse PDC system 170 can detect an approaching entity and determine whether to respond by actuating a proximity alert or to forgo actuating a proximity alert.

FIG. 3A illustrates vehicle 100 parked and having the disclosed inverse PDC system 170 installed. The inverse PDC system 170 obtains sensor data 270, e.g., from one or more of a RADAR sensor 123, a LIDAR sensor 124, a sonar sensor 125 or a camera 126 of the environment sensors 122 (FIG. 1). The sensor data 270 indicate a moving entity 300 in the vicinity of the vehicle 100. In this example scenario the entity 300 is a parking vehicle, however, this classification must be determined by the inverse PDC system 170.

To identify whether the entity 300 is a parking vehicle, the inverse PDC system 170 (e.g., vehicle detection module 220) analyzes the sensor data 270 associated with detecting the entity 300 to determine entity characteristics 250 and compare them against thresholds defined by parking vehicle profile data 260. In one or more embodiments, the parking vehicle profile data 260 can include profile data indicating multiple characteristics of parking vehicles, such as speed profiles, size profiles, dimensional profiles, trajectory profiles, image profiles, etc. The parking vehicle data 260 can be obtained from measuring characteristic values from actual parking vehicles.

Depending on the type of sensor(s) that generated the sensor data 270, different analysis techniques may be used. In one or more embodiments, when the sensor data 270 includes depth/range data (e.g., LIDAR, RADAR, sonar, etc.) the vehicle detection module 220 can determine entity characteristics 250 including a size and/or dimensional estimate of the entity 300. If the size/dimensions of the entity 300 are below predetermined thresholds associated with the minimum size/dimension of an automotive vehicle as defined by the parking vehicle profile data 260, the vehicle detection module 220 can determine that the entity 300 is a smaller entity, such as a pedestrian or a bicycle, and therefore determine that the entity 300 is not a parking vehicle.

In one or more embodiments, when the vehicle detection module 220 determines that the size/dimensions of the entity 300 are within the size/dimensional range of an automotive vehicle, the vehicle detection module 220 can analyze the sensor data 270 generated over a range of time to determine a speed and/or trajectory of the entity 300. If the speed of the entity 300 is not consistent with the speed profile of a parking vehicle as defined by the parking vehicle profile data 260 (i.e., gradually decreasing during the approach), the vehicle detection module 220 can determine that the entity 300 is not a parking vehicle but instead, for example, a bypassing vehicle.

In one or more embodiments, even when the vehicle detection module 220 determines that the size, dimensions and speed of the entity 300 match the profile of a parking vehicle as defined by the parking vehicle profile data 260, the vehicle detection module 220 can further determine a trajectory estimate of the entity 300. When the trajectory estimate does not match the trajectory of a parking vehicle as defined by the parking vehicle profile data 260 (e.g., gradually turning toward the vehicle 100) but instead indicates the entity 300 will bypass the vehicle 100, the vehicle detection module can determine that the entity 300 is not a parking vehicle but instead a bypassing vehicle.

Furthermore, although the analysis disclosed above is related generally to depth/range data, in one or more embodiments the sensor data 270 can include image data, e.g., captured by a camera or other imaging device. In this case, the vehicle detection module 220 can process the image data, e.g., using a machine learning algorithm or neural network, to classify the entity 300, e.g., as an automotive vehicle, pedestrian, bicycle, etc.

In addition, in one or more embodiments the analysis of entity characteristics 250 by the vehicle detection module 220 can be carried out in a different order from the order described above. Moreover, in one or more embodiments the vehicle detection module 220 can determine a confidence score for an entity classification by weighting multiple factors as discussed herein. For example, each of size/dimensions (D), image classification (I), speed (S), and trajectory (T) estimates may be assigned respective weights (w1, w2, w3, w4) to determine a parking vehicle score (PV_Score), e.g.:

$$Dw_1 + Iw_2 + Sw_3 + Tw_4 = PV\_Score \qquad \text{Eq. 1}$$

In one or more embodiments, each of the weights (w1, w2, w3, w4) can be assigned based on a determination of accuracy of the inverse PDC system 170 to determine the associated estimates. For example, in a vehicle with high quality LIDAR sensors and low-quality cameras, weight w1 can be assigned a higher value than weight w2. When the vehicle detection module 220 determines the score PV_Score to be above a threshold, the vehicle detection module 220 determines that the entity is a parking vehicle.

In any case, when the vehicle detection module 220 determines that the entity is a parking vehicle, the PDC detection module 230 determines whether any signal is detected indicating that the entity 300 is using a PDC. For example, in one or more embodiments the PDC detection module 230 determines whether the environment sensors 122 detect an ultrasonic signal or ultrasonic pulses emitted from the entity 300. In one or more embodiments the PDC detection module 230 can attempt to communicate with the entity 300 via V2V communication protocols to request information indicating that the entity 300 is equipped with and is using a PDC system. When the PDC detection module 230 does not detect any signals from the entity 300 indicating use of a PDC system, the PDC detection module 230 determines that the entity 300 is not using a PDC system.

When the entity 300 is determined to be a parking vehicle that is not using a PDC system, the alert module 240 provides parking assistance to the driver of the entity 300 by monitoring the approach of the entity 300 and providing proximity alerts. In one or more embodiments, the alert module 240 can provide proximity alerts that escalate in intensity as a distance between the entity 300 and the vehicle 100 decreases.

FIG. 3B illustrates the entity 300 approaching the vehicle 100 and entering within a first distance range R1. The alert module 240 can detect the entry of the entity 300 into R1, for example, based on sensor data 270. In response to detecting the entry of the entity 300 into R1, the alert module 240 can trigger a proximity alert to warn the driver of entity 300. In one or more embodiments, the proximity alert associated with R1 can be a visual alert, such as flashing the lights 102 (e.g., headlights, hazard lights, turning signals, etc.) of the vehicle 100.

In one or more embodiments, the alert module 240 can detect a side of the vehicle 100 that the entity 300 is approaching from and activate the visual alert only on the side of the vehicle 100 that the entity 300 is approaching from. For example, as shown the entity 300 is approaching a front side of the vehicle 100. In this instance, the alert module 240 activates lights 102 on the front side of the vehicle 100 and forgoes activating a visual alert on the rear side of the vehicle 100.

FIG. 3C illustrates the entity 300 approaching the vehicle 100 and entering within a second distance range R2. The alert module 240 can detect the entry of the entity 300 into R2, for example, based on sensor data 270. In response to detecting the entry of the entity 300 into R2, the alert module 240 can escalate or intensify the proximity alert to further warn the driver of entity 300 of the potential risk of a collision. In one or more embodiments, the proximity alert associated with R2 can be an audio alert, such as honking the horn 104 of the vehicle 100, activating a siren sound of the vehicle 100 security system, or actuating some other audible alert.

Although two ranges R1 and R2 are shown, in one or more embodiments the alert module 240 can define three or more ranges with associated audio/visual alerts. In one or more embodiments, the alert module 240 can escalate or intensify the proximity alert as the distance between the entity 300 and the vehicle 100 decreases by increasing brightness or volume of an audio/visual alert, and/or by combining different types of alerts together.

Figure 4A:
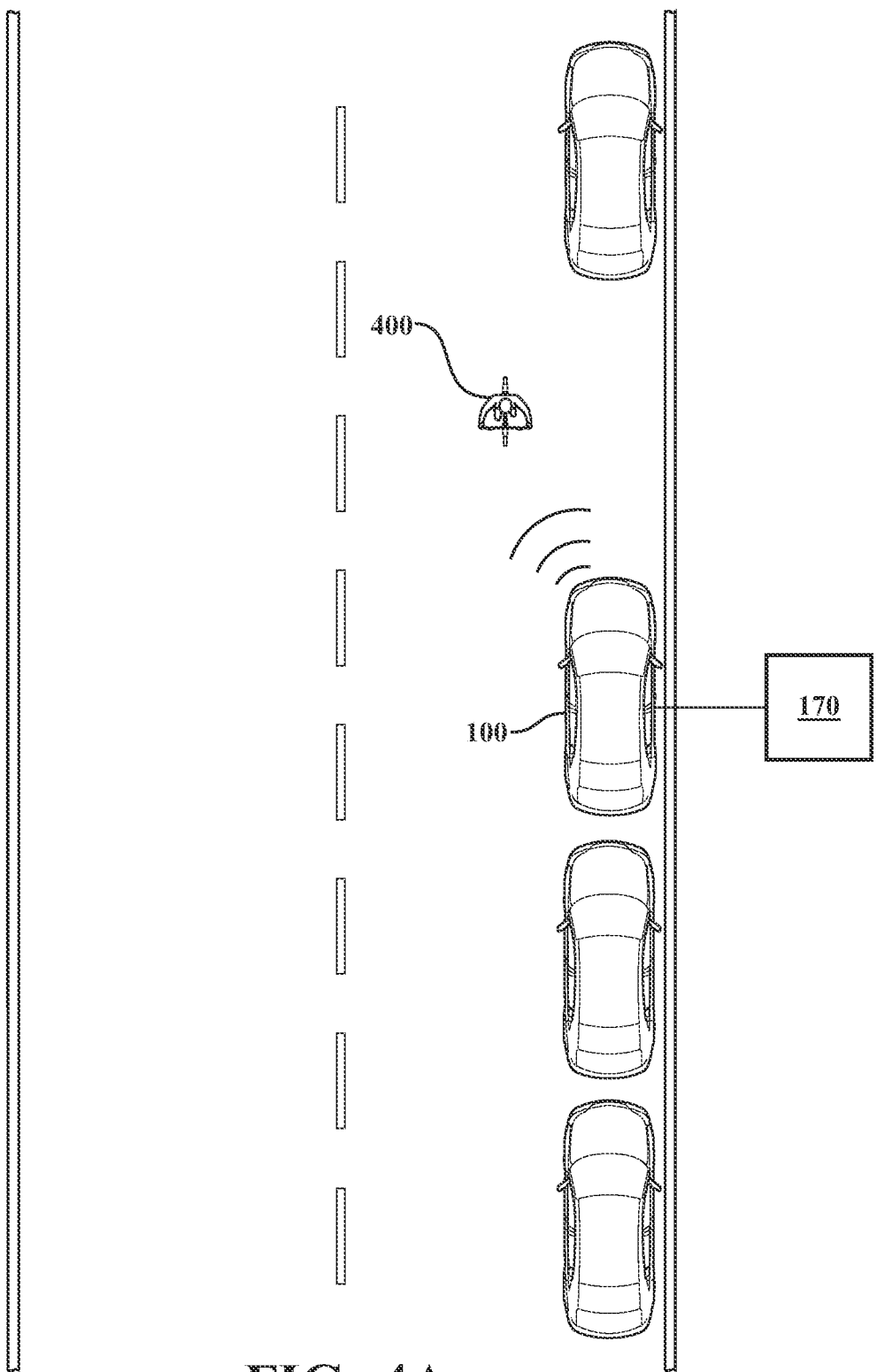
FIG. 4A illustrates an example of a non-automotive entity bypassing a vehicle using an inverse PDC system, according to the disclosed embodiments.
Figure 4B:
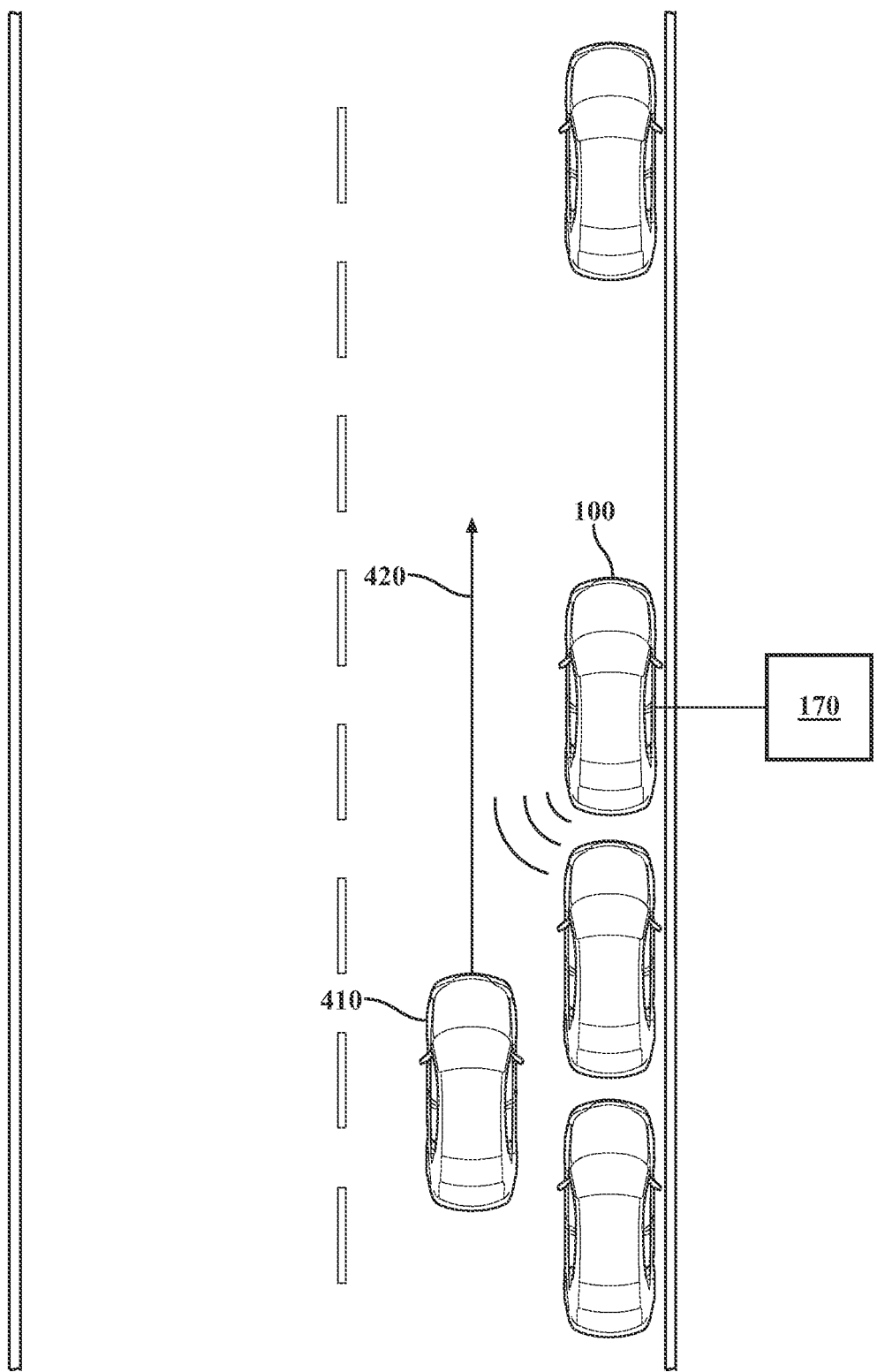
FIG. 4B illustrates an example of an automotive entity bypassing a vehicle using an inverse PDC system, according to the disclosed embodiments.
Figure 4C:
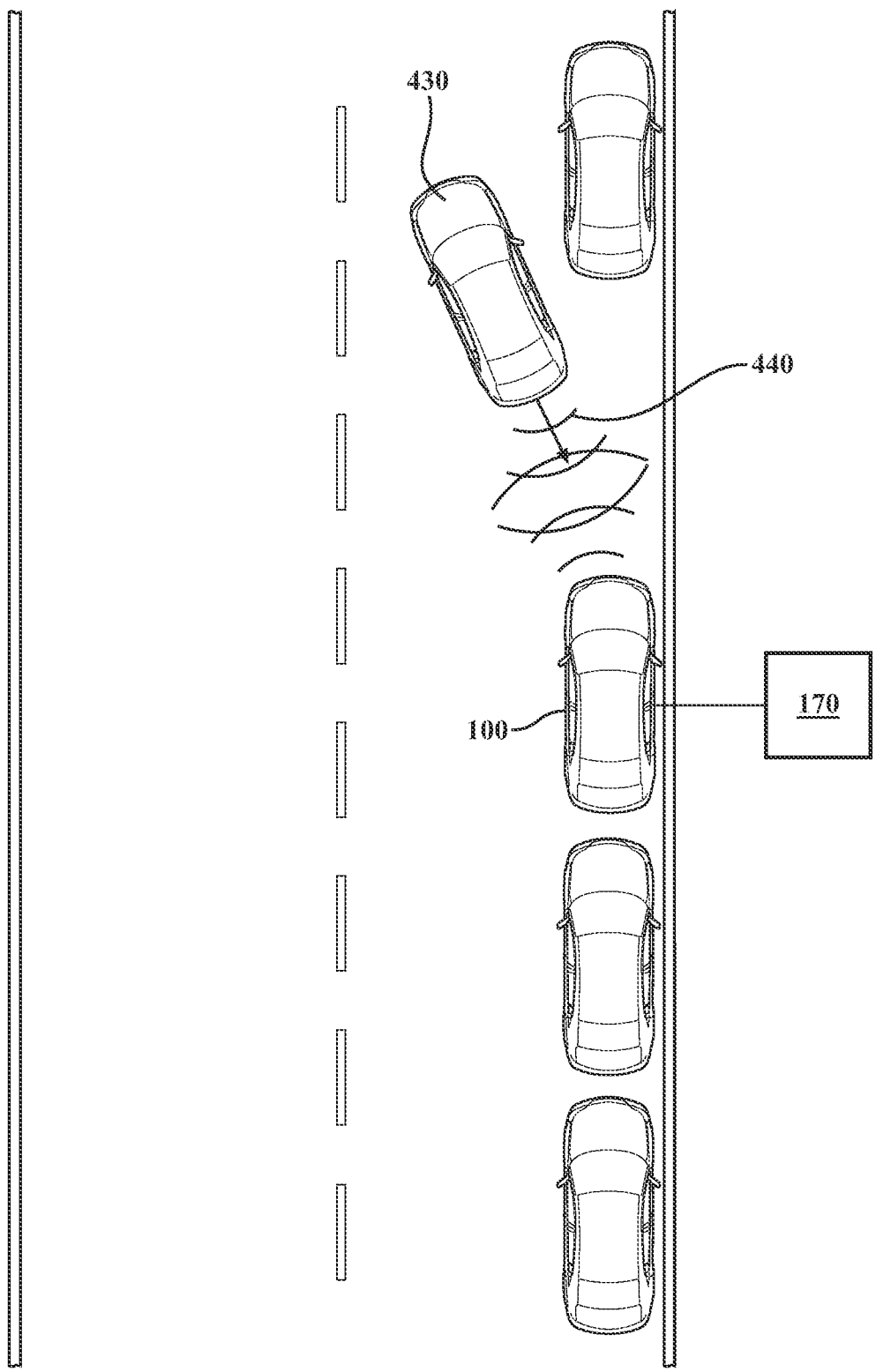
FIG. 4C illustrates an example of an automotive entity using a PDC system approaching a vehicle using an inverse PDC system, according to the disclosed embodiments.

FIG. 4A-4C illustrate example scenarios in which the disclosed inverse PDC system 170 can detect an approaching entity and determine to forgo actuating a proximity alert.

FIG. 4A illustrates an entity 400 approaching the vehicle 100. The inverse PDC system 170 detects the entity 400, for example, based on sensor data 270. In this instance, in one or more embodiments the inverse PDC system 170 (e.g., vehicle detection module 220) determines based on entity characteristics 250 (e.g., size/dimensions estimates) that the entity 400 falls outside of size/dimension profiles of an automotive vehicle according to the parking vehicle profile data 260. In one or more embodiments, the vehicle detection module 220 determines a PV_Score for the entity 400 that indicates a low confidence in concluding that the entity 400 is a parking vehicle, or a high confidence in determining that that entity 400 is not a parking vehicle. Accordingly, in this instance the alert module 240 forgoes triggering a proximity alert.

FIG. 4B illustrates an entity 410 approaching the vehicle 100. The inverse PDC system 170 detects the entity 410, for example, based on sensor data 270. In this instance, the inverse PDC system 170 (e.g., vehicle detection module 220) determines based on entity characteristics 250 (e.g., speed, trajectory estimates) that the entity 410 is traveling at high speed that does not match the speed profile of a parking vehicle according to the parking vehicle profile data 260, or is moving along a predicted trajectory 420 that does not match the trajectory of a parking vehicle according to the parking vehicle profile data 260. In one or more embodiments, the vehicle detection module 220 determines a PV_Score for the entity 400 that indicates a low confidence in concluding that the entity 400 is a parking vehicle, or a high confidence in determining that that entity 400 is not a parking vehicle. Accordingly, in this instance the alert module 240 forgoes triggering a proximity alert.

FIG. 4C illustrates an entity 430 approaching the vehicle 100. The inverse PDC system 170 detects the entity 430, for example, based on sensor data 270. In this instance, the inverse PDC system 170 (e.g., PDC detection module 230) detects signals 440 indicating that the entity 430 is currently utilizing a PDC system. In response, the alert module 240 forgoes triggering a proximity alert.

Accordingly, the disclosed inverse PDC system 170 can detect an entity approaching the vehicle 100, determine whether the entity is a parking vehicle, and determine whether the entity is utilizing a PDC system. In order to avoid unnecessary or duplicative disruption, the disclosed system 170 can actuate proximity alerts to provide parking assistance for a driver of a parking vehicle that is not utilizing a PDC system and otherwise forgo actuating proximity alerts.

Although the above-discussed example scenarios depict a so-called parallel parking incident, the disclosed embodiments may be applied in other types of parking incidents as well, such as side-by-side parking incidents. Additional and optional features of the inverse PDC system 170 and example methods of implementation will be discussed below.

Figure 5:
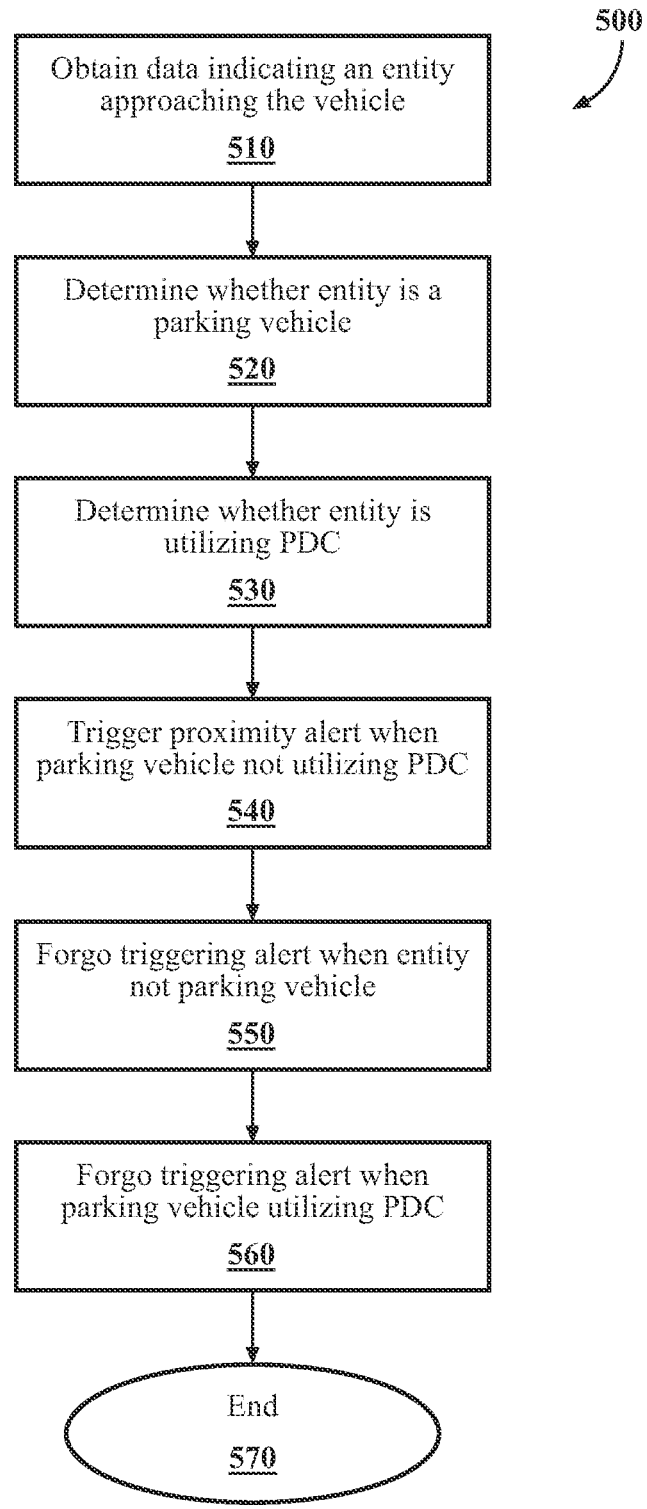
FIG. 5 illustrates an example flowchart of operations of an inverse PDC system, according to the disclosed embodiments.

FIG. 5 illustrates a flowchart of a method 500 of providing inverse parking distance control according to the disclosed embodiments. Method 500 will be discussed from the perspective of the inverse PDC system 170 of FIGS. 1 and 2. While method 500 is discussed in combination with the inverse PDC system 170, it should be appreciated that the method 500 is also not limited to being implemented within the inverse PDC system 170 but is instead one example of a system that may implement the method 500.

At operation 510, the inverse PDC system 170 (e.g., vehicle detection module 220) obtains data indicating an entity approaching the vehicle 100. For example, in one or more embodiments the vehicle detection module 220 obtains sensor data 270 generated by the environment sensor(s) 122.

At operation 520, the inverse PDC system 170 (e.g., vehicle detection module 220) determines whether the entity is a parking vehicle based on one or more characteristics of the entity derived based on the sensor data 270. For example, in one or more embodiments the vehicle detection module 220 can process samples of sensor data 270 over a period of time to search for patterns or trends in characteristics such as speed or trajectory that are similar to the profile of a parking vehicle as indicated by pre-obtained parking vehicle profile data 260. In one or more embodiments, the vehicle detection module 220 can determine whether the size/dimensions of the entity fall within a range of values that define the size/dimensions of a vehicle according to the parking vehicle profile data 260. In one or more embodiments, when the sensor data 270 include image data the vehicle detection module 220 can use a machine learning algorithm or neural network to classify the entity and determine whether the entity is a vehicle. Using any combination of these techniques and those previously discussed the vehicle detection module 220 determines whether the entity is a parking vehicle as opposed to, for example, a passing vehicle or a non-automotive entity, such as a pedestrian or cyclist.

At operation 530, the inverse PDC system 170 (e.g., PDC detection module 230) determines whether the entity is utilizing a PDC system. For example, in one or more embodiments the PDC detection module 230 determines whether the sensor data 270 indicates that the environment sensor(s) 122 have detected that the entity is emitting signals consistent with or similar to signals emitted from a PDC system, such as ultrasonic signals, ultrasonic pulses, or electromagnetic pulses. When no such signals are detected, the PDC detection module 230 determines that the entity is not utilizing a PDC system.

At operation 540, the inverse PDC system 170 (e.g., alert module 240) triggers a proximity alert when the entity approaches within a threshold distance of the vehicle 100 and is determined to be a parking vehicle that is not utilizing a PDC system. In one or more embodiments the proximity alert can have multiple phases that involve triggering different types of audio/visual alerts at different distance ranges. For example, in one or more embodiments the proximity alert includes a visual alert triggered when the entity enters a first distance range from the vehicle 100 and an audio alert triggered when the entity enters a second distance range from the vehicle 100 shorter than the first distance range. The number of phases is not limited to two. In one or more embodiments the proximity alert is executed using existing components of the vehicle 100, such as headlights, hazard lights, turning signals, horn, and security system siren. In one or more embodiments, the proximity alert is executed using additional alert components installed on the vehicle 100, such as a windshield display or external audio/visual alert component.

In one or more embodiments, the proximity alert includes a visual alert executed by activating lights on the vehicle 100 that are disposed on a first side of the vehicle 100 facing the entity while forgoing activating lights on a second side of the vehicle 100 opposite the first side.

At operation 550, the inverse PDC system 170 (e.g., alert module 240) forgoes triggering the proximity alert when the approaching entity is not determined to be a parking vehicle.

At operation 560, the inverse PDC system 170 (e.g., alert module 240) forgoes triggering the proximity alert when the approaching entity is determined to be utilizing a PDC system. The method ends at operation 570.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and can further include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles) and store the data as sensor data 270.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself, such as one or more actual states of the vehicle 100 as discussed above. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense environment data. "Environment data" includes data or information about the external environment in which an autonomous vehicle is located or one or more portions thereof. For example, the one or more environment sensors 122 can be configured to detect, quantify and/or sense entities and obstacles in at least a portion of the external environment of the vehicle 100 and/or information/data about such entities and obstacles. Such entities may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126, e.g., one or more monocular cameras. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger).

The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed. One or more of these systems can by operably connected to wheels of the vehicle in a manner that allows individual application of control or commands implemented by the respective system.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the inverse PDC system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities. The inverse PDC system 170 can determine one or more electronic command signals or actuation commands as needed for controlling one or more of the actuators 150 or electronic components, e.g., headlights, hazard lights, turning signals, horn, siren, etc., as discussed above.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of entities, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s) and determine current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An inverse parking distance control (PDC) system for a vehicle, comprising:
   a sensor configured to generate sensor data indicating an entity approaching the vehicle;
   a processor; and
   a memory, communicably connected to the one or more processors, storing:
      a vehicle detection module including instructions that, when executed by the processor, cause the processor to determine whether the entity is a parking vehicle based on one or more characteristics of the entity derived from the sensor data,
      a PDC detection module including instructions that, when executed by the processor, cause the processor to determine whether the entity is utilizing a PDC system, and
      an alert module including instructions that, when executed by the processor, cause the processor to trigger a proximity alert when the entity approaches within a threshold distance of the vehicle and is determined to be a parking vehicle that is not utilizing a PDC system.

2. The inverse PDC system of claim 1, wherein the alert module further includes instruction to forgo triggering the proximity alert when the entity is not determined to be the parking vehicle.

3. The inverse PDC system of claim 1, wherein the alert module further includes instruction to forgo triggering the proximity alert when the entity is determined to be utilizing the PDC system.

4. The inverse PDC system of claim 1, wherein the one or more characteristics of the entity derived from the sensor data include one or more of dimensions of the entity, speed of the entity, or a projected trajectory of the entity.

5. The inverse PDC system of claim 1, wherein the instructions to determine whether the entity is utilizing the PDC system include instructions to determine whether the entity is utilizing the PDC system based on detecting, with the sensor, whether the entity is emitting ultrasonic pulses.

6. The inverse PDC system of claim 1, wherein the proximity alert comprises a visual alert triggered when the entity enters a first distance range from the vehicle and an audio alert triggered when the entity enters a second distance range from the vehicle shorter than the first distance range.

7. The inverse PDC system of claim 1, wherein the proximity alert comprises a visual alert executed by activating lights on the vehicle that are disposed on a first side of the vehicle facing the entity while forgoing activating lights on a second side of the vehicle opposite the first side.

8. A method for providing inverse parking distance control (PDC) for a vehicle, comprising:
   obtaining sensor data indicating an entity approaching the vehicle;
   determining whether the entity is a parking vehicle based on one or more characteristics of the entity derived from the sensor data;
   determining whether the entity is utilizing a PDC system; and
   triggering a proximity alert when the entity approaches within a threshold distance of the vehicle and is determined to be a parking vehicle that is not utilizing a PDC system.

9. The method of claim 8, further comprising forgoing triggering the proximity alert when the entity is not determined to be the parking vehicle.

10. The method of claim 8, further comprising forgoing triggering the proximity alert when the entity is determined to be utilizing the PDC system.

11. The method of claim 8, wherein the one or more characteristics of the entity derived from the sensor data include one or more of dimensions of the entity, speed of the entity, or a projected trajectory of the entity.

12. The method of claim 8, further comprising determining whether the entity is utilizing the PDC system based on detecting, with a sensor, whether the entity is emitting ultrasonic pulses.

13. The method of claim 8, wherein the proximity alert comprises a visual alert triggered when the entity enters a first distance range from the vehicle and an audio alert triggered when the entity enters a second distance range from the vehicle shorter than the first distance range.

14. The method of claim 8, wherein the proximity alert comprises a visual alert executed by activating lights on the vehicle that are disposed on a first side of the vehicle facing the entity while forgoing activating lights on a second side of the vehicle opposite the first side.

15. A non-transitory computer-readable medium for providing inverse parking distance control (PDC) for a vehicle, including instructions that, when executed by one or more processors, cause the one or more processors to:
   obtain sensor data indicating an entity approaching the vehicle;
   determine whether the entity is a parking vehicle based on one or more characteristics of the entity derived from the sensor data;
   determine whether the entity is utilizing a PDC system; and
   trigger a proximity alert when the entity approaches within a threshold distance of the vehicle and is determined to be a parking vehicle that is not utilizing a PDC system.

16. The non-transitory computer-readable medium of claim 15, further comprising instructions to forgo triggering the proximity alert when the entity is not determined to be the parking vehicle.

17. The non-transitory computer-readable medium of claim 15, further comprising instructions to forgo triggering the proximity alert when the entity is determined to be utilizing the PDC system.

18. The non-transitory computer-readable medium of claim 15, further comprising instructions to determine whether the entity is utilizing the PDC system based on detecting, with a sensor, whether the entity is emitting ultrasonic pulses.

19. The non-transitory computer-readable medium of claim 15, wherein the proximity alert comprises a visual alert triggered when the entity enters a first distance range from the vehicle and an audio alert triggered when the entity enters a second distance range from the vehicle shorter than the first distance range.

20. The non-transitory computer-readable medium of claim 15, wherein the proximity alert comprises a visual alert executed by activating lights on the vehicle that are disposed on a first side of the vehicle facing the entity while forgoing activating lights on a second side of the vehicle opposite the first side.

* * * * *